United States Patent
Nishijima

(10) Patent No.: US 10,102,433 B2
(45) Date of Patent: Oct. 16, 2018

(54) TRAVELING ROAD SURFACE DETECTION APPARATUS AND TRAVELING ROAD SURFACE DETECTION METHOD

(71) Applicant: TOYOTA JIDOSHA KABUSHIKI KAISHA, Toyota-shi, Aichi-ken (JP)

(72) Inventor: Masakazu Nishijima, Ebina (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 230 days.

(21) Appl. No.: 15/016,947

(22) Filed: Feb. 5, 2016

(65) Prior Publication Data
US 2016/0232412 A1    Aug. 11, 2016

(30) Foreign Application Priority Data
Feb. 9, 2015 (JP) ................. 2015-023400

(51) Int. Cl.
G06K 9/00 (2006.01)
H04N 13/02 (2006.01)

(52) U.S. Cl.
CPC ..... *G06K 9/00791* (2013.01); *H04N 13/0239* (2013.01)

(58) Field of Classification Search
CPC .......... H04N 13/0239; H04N 13/0203; H04N 7/183; G06K 9/00791; B60R 2300/80; B60R 1/00
See application file for complete search history.

(56) References Cited

U.S. PATENT DOCUMENTS

| | | | | |
|---|---|---|---|---|
| 2009/0316956 A1* | 12/2009 | Higuchi | ............. | G06K 9/00805 382/103 |
| 2011/0234761 A1* | 9/2011 | Yumiba | ..................... | B60R 1/00 348/46 |
| 2012/0147187 A1* | 6/2012 | Li | ........................ | G06K 9/3233 348/148 |
| 2014/0071240 A1 | 3/2014 | Chen et al. | | |

\* cited by examiner

*Primary Examiner* — Sathyanaraya V Perungavoor
*Assistant Examiner* — Peet Dhillon
(74) *Attorney, Agent, or Firm* — Sughrue Mion, PLLC

(57) ABSTRACT

An apparatus that detects a road surface on the basis of a parallax image around a vehicle, the road surface detection apparatus includes an ECU configured to determine on the basis of parallax information of the parallax image whether a unit area is a road surface area for each unit area of the parallax image associates each unit area with a grid in a map on the basis of parallax information and coordinate position of the unit area, an eye point of the map being set so as to be higher than an eye point of the parallax image, the map being obtained by partitioning an area around the vehicle in a grid, and detect road surface grids and each grid located between the road surface grids as the road surface, the road surface grids being the grids corresponding to the unit areas determined as the road surface areas.

4 Claims, 8 Drawing Sheets

FIG. 3A

| PIXEL ID | x | y | z |
|---|---|---|---|
| 1 | 1 | 1 | 100 |
| 2 | 1 | 2 | 200 |
| : | : | : | : |
| : | : | : | : |
| 4096 | 64 | 64 | 100 |

FIG. 3B

| PIXEL ID | ROAD SURFACE FLAG | LABEL |
|---|---|---|
| 1 | 1 | 2 |
| 2 | 0 | -- |
| 3 | 1 | 1 |
| : | : | : |
| 4096 | 1 | 2 |

FIG. 3C

| GRID ID | X | Z |
|---|---|---|
| 1 | 1 | 1 |
| 2 | 1 | 2 |
| : | : | : |
| : | : | : |
| 240 | 15 | 16 |

FIG. 3D

| PIXEL ID | ROAD SURFACE FLAG | LABEL | SEARCH ID |
|---|---|---|---|
| 1 | 0 | -- | 1 |
| 2 | -- | -- | 4 |
| 3 | 1 | 2 | 1 |
| : | : | : | : |
| 240 | 1 | 1 | 1 |

# TRAVELING ROAD SURFACE DETECTION APPARATUS AND TRAVELING ROAD SURFACE DETECTION METHOD

INCORPORATION BY REFERENCE

The disclosure of Japanese Patent Application No. 2015-023400 filed on Feb. 9, 2015 including the specification, drawings and abstract is incorporated herein by reference in its entirety.

BACKGROUND OF THE INVENTION

1. Field of the Invention

The invention relates to a traveling road surface detection apparatus and a traveling road surface detection method.

2. Description of Related Art

US Patent Application Publication No. 2014/0071240 describes an apparatus that detects a traveling road surface. This apparatus acquires a parallax image, in which parallax information is associated with each pixel, by the use of images respectively obtained from right and left cameras, identifies a road surface area on the basis of the pieces of parallax information of the parallax image, and performs coordinate transformation of the parallax image onto a grid plan map, thus detecting a traveling road surface.

However, at the time of coordinate transformation from the parallax image onto the plan map, a continuous road surface area in the parallax image may be discontinuous areas on the grid plan map because of, for example, the difference between the eye point of the parallax image and the eye point of the plan map. In this case, the apparatus described in US Patent Application Publication No. 2004/0071240 erroneously detects the continuous traveling road surface as a traveling road surface including multiple gaps or divided multiple traveling road surfaces. In this technical field, a traveling road surface detection apparatus and a traveling road surface detection method that are able to improve a decrease in the accuracy of detecting a traveling road surface are desired.

SUMMARY OF THE INVENTION

An aspect of the invention provides a traveling road surface detection apparatus that detects a traveling road surface on the basis of a parallax image around a vehicle. The parallax image is acquired by an in-vehicle camera. The traveling road surface detection apparatus includes an electronic control unit configured to i) determine on the basis of parallax information of the parallax image whether a unit area is a road surface area or a non-road surface area for each unit area of the parallax image, each unit area including one or multiple pixels, ii) associate each unit area with a grid in a map on the basis of parallax information, and coordinate position of the unit area, an eye point of the map being set so as to be higher than an eye point of the parallax image, the map being obtained by partitioning an area around the vehicle in a grid, and iii) detect road surface grids and each grid located between the road surface grids on the map as the traveling road surface on the map, the road surface grids being the grids corresponding to the unit areas determined as the road surface areas.

With this traveling road surface detection apparatus, after coordinate transformation of the parallax image onto the map is performed by the electronic control unit, each grid that is not a road surface grid but located between road surface grids on the map is detected as the traveling road surface on the map by the electronic control unit. Therefore, with this traveling road surface detection apparatus, for example, even when areas on the map corresponding to the road surface areas are discontinuous at the time when the parallax image including the road surface areas is subjected to coordinate transformation and projected onto the map, it is possible to detect the traveling road surface by interpolating the discontinuous areas. Therefore, this apparatus is able to improve a decrease in the accuracy of detecting a traveling road surface.

In one embodiment, the electronic control unit may detect the traveling road surface on the map by setting each grid sandwiched between the road surface grids arranged in one of radially extending directions with reference to a position of the in-vehicle camera on the map for the grid located between the road surface grids on the map. For example, if the apparatus is configured to detect each grid sandwiched between the road surface grids arranged in a lateral direction (vehicle width direction) with reference to the position of the in-vehicle camera on the map as the traveling road surface, there is a concern that the grid behind an obstacle, which cannot be recognized from the in-vehicle camera that is an observation point, is detected as the traveling road surface. In contrast, the traveling road surface detection apparatus sets each grid sandwiched between the road surface grids arranged in the radially extending direction with reference to the position of the in-vehicle camera as the grid located between the road surface grids on the map. Therefore, for example, it is possible to avoid erroneous detection of the grid behind an obstacle as the traveling road surface.

In one embodiment, the traveling road surface detection apparatus may further include an area identification unit that, on the basis of a coordinate position or pixel information of each unit area determined as the road surface area by the area determination unit, associates identification information that identifies the corresponding road surface area with each unit area determined as the road surface area by the area determination unit. When the pieces of identification information respectively associated with the unit areas corresponding to a pair of the road surface grids that sandwich the grid are different from each other, the detection unit may not detect the grid sandwiched between the pair of the road surface grids as the traveling road surface. In this case, with the traveling road surface detection apparatus, for example, when a plurality of road surface areas are included in the parallax image, it is possible to avoid erroneous detection of the grid corresponding to each unit area between the road surface areas as the traveling road surface.

Another aspect of the invention provides a traveling road surface detection method that detects a traveling road surface on the basis of a parallax image around a vehicle. The parallax image is acquired by an in-vehicle camera. The traveling road surface detection method includes: determining on the basis of parallax information of the parallax image whether a unit area is a road surface area or a non-road surface area for each unit area of the parallax image, each unit area including one or multiple pixels; associating each unit area with a grid in a map on the basis of parallax information and coordinate position of the unit area, an eye point of the map being set so as to be higher than an eye point of the parallax image, the map being obtained by partitioning an area around the vehicle in a grid; and detecting road surface grids and each grid located between the road surface grids on the map as the traveling road surface on the map, the road surface grids being the grids corresponding to the unit areas determined as the road surface areas. With this method, as well as the advantageous effects obtained from the traveling road surface detection apparatus according to the above-described aspect of the invention, it is possible to improve a decrease in the accuracy of detecting a traveling road surface.

According to various aspects and embodiments of the invention, it is possible to improve a decrease in the accuracy of detecting a traveling road surface.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A is a table that illustrates an example of data that are processed by the traveling road surface detection apparatus according to the embodiment;

FIG. 3B is a table that illustrates an example of data that are processed by the traveling road surface detection apparatus according to the embodiment;

FIG. 3C is a table that illustrates an example of data that are processed by the traveling road surface detection apparatus according to the embodiment;

FIG. 3D is a table that illustrates an example of data that are processed by the traveling road surface detection apparatus according to the embodiment;

DETAILED DESCRIPTION OF EMBODIMENTS

Hereinafter, an embodiment of the invention will be described with reference to the accompanying drawings.

Figure 1:
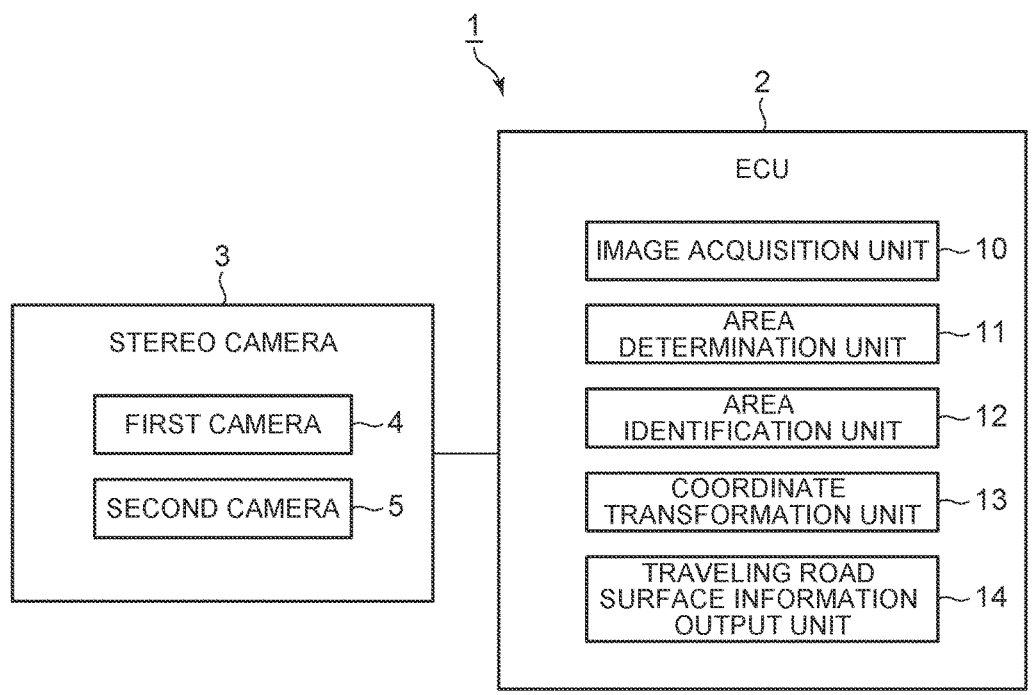
FIG. 1 is a block diagram that illustrates a traveling road surface detection apparatus according to an embodiment.

FIG. 1 is a block diagram that illustrates a traveling road surface detection apparatus according to the present embodiment. The traveling road surface detection apparatus 1 shown in FIG. 1 detects a traveling road surface on the basis of a parallax image around a vehicle. The traveling road surface is, for example, a road surface on which the vehicle is allowed to travel. The traveling road surface may include not only the road surface of a road on which the vehicle travels but also the road surface of a passage and parking space in a parking lot. In the present embodiment, description will be made on the assumption that the traveling road surface detection apparatus 1 is mounted on a vehicle, such as a passenger automobile.

The traveling road surface detection apparatus 1 detects a traveling road surface on the basis of a parallax image acquired by an in-vehicle camera that captures images around the vehicle. The parallax image is an image (data) that includes parallax information or depth information. For example, parallax information or depth information is associated with each of pixels that constitute the parallax image. More specifically, the parallax image is an image in which, for example, coordinate positions in the image are associated with the pieces of parallax information or depth information.

Configuration of Traveling Road Surface Detection Apparatus

As shown in FIG. 1, the traveling road surface detection apparatus 1 includes an electronic control unit (ECU) 2 and a stereo camera 3 (an example of an in-vehicle camera) for the purpose of detecting a traveling road surface. The ECU 2 is an electronic control unit including a central processing unit (CPU), a read only memory (ROM), a random access memory (RAM), a controller area network (CAN) communication circuit, and the like. The ECU 2 is, for example, connected to a network through which communication is carried out with the use of the CAN communication circuit, and is communicably connected to the stereo camera 3. The ECU 2, for example, inputs or outputs data by operating the CAN communication circuit on the basis of signals output from the CPU, stores input data in the RAM, loads programs stored in the ROM onto the RAM, and executes the programs loaded onto the RAM, thus implementing the functions of components (described later). The ECU 2 may be formed of a plurality of electronic control units.

The stereo camera 3 is an image acquisition device that acquires a parallax image by capturing images around the vehicle. The stereo camera 3 includes, for example, two cameras. In FIG. 1, the stereo camera 3 includes a first camera 4 and a second camera 5 arranged so as to replicate a binocular parallax. The first camera 4 and the second camera 5 are, for example, provided on the back side of the windshield of the vehicle, and capture images ahead of the vehicle.

The stereo camera 3 generates a parallax image by using a first image and a second image respectively captured by the first camera 4 and the second camera 5. The stereo camera 3, for example, executes the process of searching the second image for corresponding points corresponding to pixels of the first image with reference to the first image for each pixel of the first image, and calculates parallax information for each pixel.

The parallax information is, for example, a distance between a pixel position of the first image and a pixel position of a corresponding point of the second image (a pixel-to-pixel distance in the image). The stereo camera 3, for example, generates an image that associates an abscissa position x and an ordinate position y in the image with a pixel-to-pixel distance as a parallax image. The pixel-to-pixel distance is parallax information. The stereo camera 3 may obtain depth information (information about a distance from the stereo camera 3) for each pixel by applying the parallax information of each pixel to a general formula for transformation, and may generate an image in which an abscissa position x and an ordinate position y in the image are associated with depth information, as a parallax image. The general formula for transformation is a formula in which basic information (for example, a camera-to-camera distance, and the like) of the stereo camera 3 is set as a coefficient and parallax information and depth information are inversely proportional to each other. The stereo camera 3 transmits the acquired parallax image to the ECU 2.

Next, the functional configuration of the ECU 2 will be described. As shown in FIG. 1, the ECU 2 includes an image acquisition unit 10, an area determination unit 11, an area identification unit 12, a coordinate transformation unit 13 and a traveling road surface information output unit (detection unit) 14.

Figure 2:
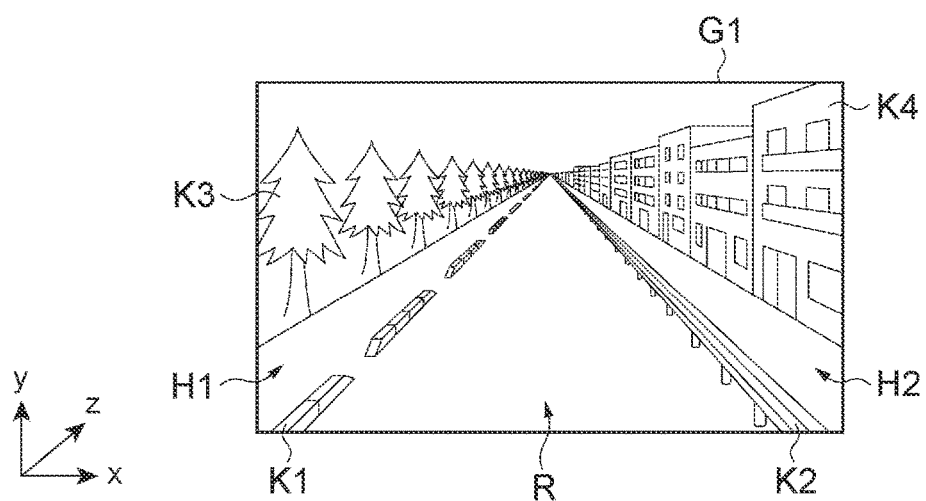
FIG. 2 is a view that shows an example of a parallax image captured by a stereo camera.

The image acquisition unit 10 acquires a parallax image from the stereo camera 3. The image acquisition unit 10 is implemented when the CAN communication circuit operates on the basis of a signal output from the CPU. FIG. 2 is a view that shows an example of a parallax image captured by the stereo camera 3. The parallax image G1 shown in FIG. 2 is an image generated from captured images ahead of the vehicle. As shown in FIG. 2, a traveling road surface R on which the vehicle travels lies between a curb K1 and a guard rail K2. A sidewalk H1 lies between the curb K1 and trees K3 located outside the curb K1. A sidewalk H2 lies between the guard rail K2 and buildings K4 located outside the guard rail K2. FIG. 3A is an example of a data table of a parallax image. In the table shown in FIG. 3A, a pixel ID that identifies each of pixels, an x-coordinate position in the parallax image G1, a y-coordinate position in the parallax image G1 and depth information z are associated with one another. For example, (1,1) as the coordinates (x,y) and "100" as the depth information z are associated with the pixel ID "1". Similarly, (1,2) as the coordinates (x,y) and "200" as the depth information are associated with the pixel ID "2". Association of each pixel ID with a pixel value is omitted here. The image acquisition unit 10 stores the acquired parallax image in a storage area, such as the RAM.

The area determination unit 11 determines whether a unit area is a road surface area or a non-road surface area for each unit area of the parallax image G1 on the basis of the pieces of parallax information of the parallax image G1. Each unit area of the parallax image G1 includes one or multiple pixels. The area determination unit 11 is implemented when the CPU loads a program stored in the ROM onto the RAM and executes the program loaded onto the RAM. The unit area is an area in the parallax image G1, and the area includes one or multiple pixels. That is, the minimum unit area is an area including one pixel. Hereinafter, an example in which the unit area is one pixel (per pixel) will be described.

The area determination unit 11, for example, repeatedly executes the process of setting a pixel on which determination is carried out and the process of carrying out determination on the pixel by scanning the parallax image G1 from the top left pixel to the bottom right pixel. The road surface area is a range in which a road surface is drawn in the parallax image G1. The non-road surface area is an area other than the road surface area, and is, for example, a range in which an object other than the road surface is drawn in the parallax image G1. The object other than the road surface is, for example, a building, a tree, a guard rail, a curb, or the like.

An example of determination as to whether the pixel is a road surface area by the area determination unit 11 will be described. The area determination unit 11 estimates a road surface gradient for each pixel by utilizing statistical data acquired in advance. The statistical data indicate the relationship between depth information and a road surface gradient. Subsequently, the area determination unit 11 acquires height information Hy (corresponding to y coordinate in the parallax image) of the estimated road surface gradient by using the depth information of each pixel (x coordinate, y coordinate) and the estimated corresponding road surface gradient. The area determination unit 11 compares the y coordinate with the height information Hy. When the difference is smaller than a predetermined value, the area determination unit 11 determines that the pixel is a road surface area; whereas, when the difference is larger than or equal to the predetermined value, the area determination unit 11 determines that the pixel is a non-road surface area. FIG. 3B is an example of a data table that is managed by the area determination unit 11. In the table shown in FIG. 3B, a pixel ID, a road surface flag that determines whether the pixel is a road surface area or a non-road surface area and a label (described later) are associated with one another. The road surface flag is data that indicates that the pixel is a road surface area when the road surface flag is set to "1" and that indicates that the pixel is a non-road surface area when the road surface flag is "0". The road surface flag is a result determined by the area determination unit 11. For example, when the pixel of the pixel ID "1" is a road surface area, the area determination unit 11 associates "1" as the road surface flag with the pixel ID "1". Similarly, when the pixel of the pixel ID "2" is a non-road surface area, the area determination unit 11 associates "0" as the road surface flag with the pixel ID "2".

On the basis of the coordinate position of each pixel determined as the road surface area by the area determination unit 11, the area identification unit 12 associates identification information that identifies the corresponding road surface area with each pixel determined as the road surface area by the area determination unit 11. The area identification unit 12 is implemented when the CPU loads a program stored in the ROM onto the RAM and executes the program loaded onto the RAM. The identification information is, for example, information that is able to uniquely identify a road surface area group. A specific example of the identification information is a label that indicates a road surface area group.

Figure 4:
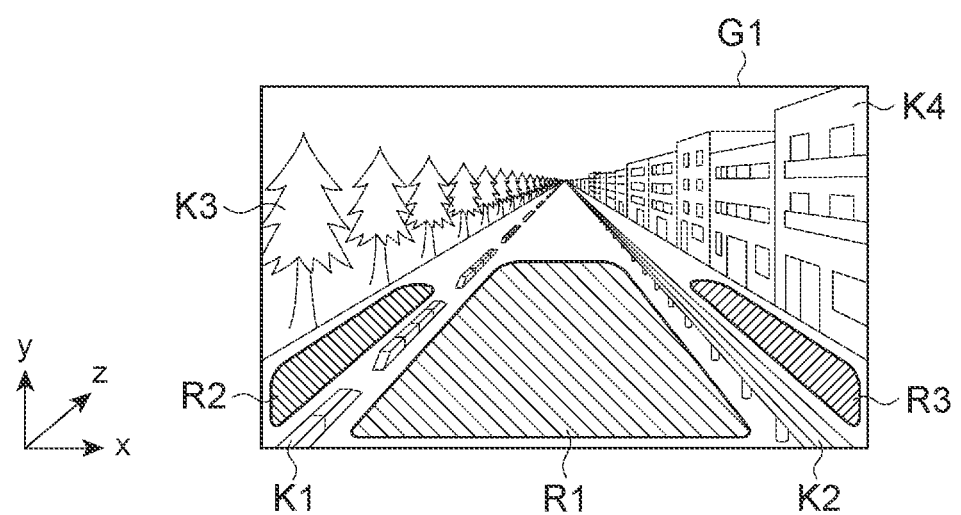
FIG. 4 is an example of road surface areas in the parallax image.

Initially, the area identification unit 12 determines connectivity with other pixels by using the coordinate position of each pixel determined as the road surface area by the area determination unit 11. For example, when adjacent pixels in the upper, lower, right, left and oblique directions around a pixel to be processed are pixels determined as road surface areas, the area identification unit 12 determines that there is connectivity between the pixel to be processed and the adjacent pixels. Subsequently, the area identification unit 12 associates the same label with the pixel to be processed and the adjacent pixels, between which it is determined that there is connectivity. That is, when pixels are associated with the same label, the pixels are included in the same road surface area. The above-described table shown in FIG. 3B is also managed by the area identification unit 12. When the area identification unit 12 determines that there is connectivity between the pixel to be processed and the adjacent pixels, the area identification unit 12 updates the labels of the table shown in FIG. 3B. For example, when the area identification unit 12 determines that there is connectivity between the pixel of the pixel ID "1" and the pixel of the pixel ID "4096", the area identification unit 12 updates the labels of these pixel IDs with the same label "2". FIG. 4 is an example of road surface areas in a parallax image. FIG. 4 shows three road surface areas R1, R2, R3 on the parallax image G1. For example, the road surface area R1 consists of a group of pixels associated with the label "1", the road surface area R2 consists of a group of pixels associated with the label "2", and the road surface area R3 consists of a group of pixels associated with the label "3". That is, pixels of the pixel IDs associated with the label "1" in the table shown in FIG. 3B are pixels that constitute the road surface area R1 in the parallax image G1 shown in FIG. 4. Similarly, pixels of the pixel IDs associated with the label "2" in the table shown in FIG. 3B are pixels that constitute the road surface area R2 in the parallax image G1 shown in FIG. 4. Similarly, pixels of the pixel IDs associated with the label "3" in the table shown in FIG. 3B are pixels that constitute the road surface area R3 in the parallax image G1 shown in FIG. 4.

The area identification unit 12 may determine whether there is connectivity by using pieces of pixel information instead of the positional relationship (positional coordinates) among pixels determined as road surface areas. The pixel information is a pixel value, such as a luminance, a chromaticness and a contrast. For example, the area identification unit 12 may associate the same label with a group of pixels among which a difference in luminance is smaller than or equal to a predetermined value. In this way, the area identification unit 12 is able to label pixels by using pixel values when the pieces of parallax information of the pixels are not accurately acquired. The area identification unit 12 may determine whether there is connectivity by using the positional relationship among pixels determined as road surface areas and the pieces of pixel information of the pixels.

The coordinate transformation unit 13 associates each pixel with a grid in a grid map (an example of a map) on the basis of the parallax information and coordinate position of the pixel. The eye point of the grid map is set so as to be higher than the eye point of the parallax image G1. The grid map is obtained by partitioning an area spreading ahead of the vehicle (an example of an area around a vehicle) in a grid. The coordinate transformation unit 13 is implemented when the CPU loads a program stored in the ROM onto the RAM and executes the program loaded onto the RAM.

The grid map is, for example, provided such that a two-dimensional plane represented by a distance from the vehicle and a lateral position is partitioned at set intervals into cells. The individual cells of the grid map are called grids. Each cell may have a square shape or a rectangular shape. The grid map has a data structure of, for example, data tables shown in FIG. 3C and FIG. 3D. As shown in FIG. 3C, the abscissa X (corresponding to the abscissa x of the parallax image) of the map and the ordinate Z (corresponding to the depth information z of the parallax image) of the map are associated with each grid ID that uniquely identifies a corresponding one of the grids. The coordinate transformation unit 13, for example, identifies a position on the grid map, corresponding to each pixel ID, by substituting the corresponding parallax information and coordinate position, associated with the pixel ID, into a general coordinate transformation formula, thus deriving the grid ID corresponding to each pixel ID. That is, the coordinate transformation unit 13 consults the data tables shown in FIG. 3A and FIG. 3B, and transforms the pixel position to the grid (X,Z) on the grid map by using the positional information (x-coordinate position) and the depth information z, associated with the pixel ID, and the coordinate transformation formula, thus associating each pixel ID with a corresponding one of the grid IDs.

The coordinate transformation unit 13 assigns the road surface flag and label associated with each pixel ID to the grid ID corresponding to the pixel ID. For example, as shown in FIG. 3D, the road surface flag, the label and a search ID (described later) are associated with each grid ID. The coordinate transformation unit 13 assigns the road surface flag and the label, associated with each pixel ID, to a corresponding one of the grid IDs. When one grid ID corresponds to a plurality of pixel IDs, the coordinate transformation unit 13 may determine one road surface flag and one label on the basis of a predetermined condition from the road surface flags and labels associated with the plurality of pixel IDs, and may associate the determined road surface flag and label with the grid ID. Hereinafter, description will be made on the assumption that a grid corresponding to a pixel determined as a road surface area by the area determination unit 11, that is, a grid of which the road surface flag is "1", is termed "road surface grid" and a grid of which the road surface flag is "0" is termed "non-road surface grid". As will be described later, because there is a grid that applies neither a road surface grid nor a non-road surface grid, FIG. 3D shows an example in which the road surface flag of such a grid is set to a NULL value "–" (see the grid ID "2").

Figure 5A:
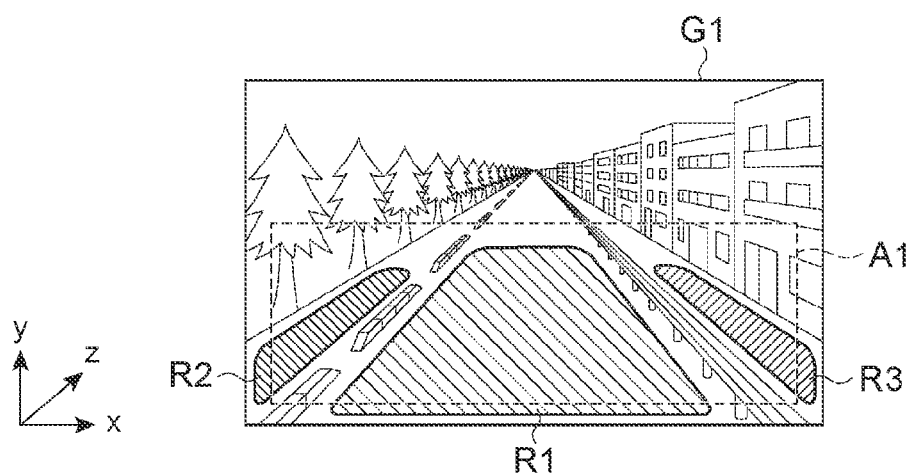
FIG. 5A is a view that shows an example of a predetermined area in the parallax image in an example of coordinate transformation from the parallax image to a grid map.
Figure 5B:
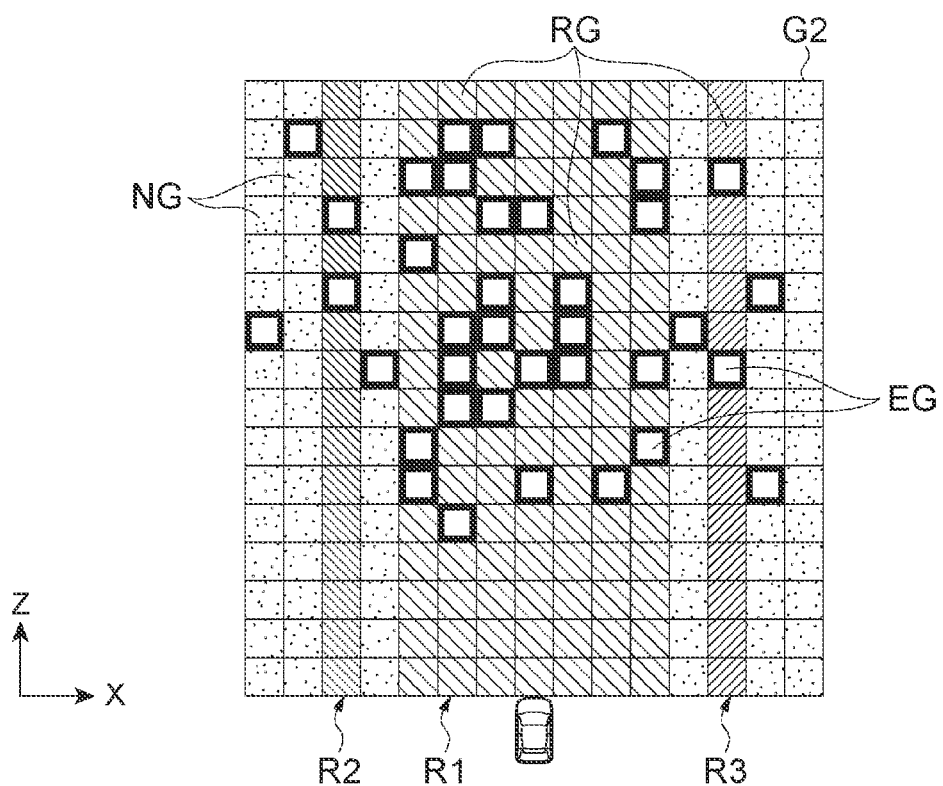
FIG. 5B is a view that illustrates an example of a grid map corresponding to the predetermined area of the parallax image as an example of coordinate transformation from the parallax image to the grid map.

FIG. 5A and FIG. 5B are views that illustrate an example of coordinate transformation from the parallax image G1 to a grid map G2. FIG. 5A is an example of the parallax image G1. FIG. 5B is an example of the grid map G2 corresponding to a predetermined area A1 in the parallax image G1. The grid map G2 shown in FIG. 5B is a map in which an area ahead of the vehicle in plan view is partitioned in a grid, and data shown in FIG. 3C and FIG. 3D are visualized. The grid map G2 includes road surface grids RG. In the drawing, hatched grids are the road surface grids RG. In the drawing, the type of hatching is changed depending on the label. For example, the label "1" is associated with the road surface grid RG corresponding to the road surface area R1, the label "2" is associated with the road surface grid RG corresponding to the road surface area R2, and the label "3" is associated with the road surface grid RG corresponding to the road surface area R3. That is, different types of diagonal line hatching in the drawing are used respectively for the label "1", the label "2", and the label "3". In the grid map G2, non-road surface grids NG correspond to pixels associated with the non-road surface areas. In the drawing, grids filled with dots are the non-road surface grids NG.

The traveling road surface information output unit 14, for example, scans (searches) the grid map G2, connects the road surface grids RG in order of the scanning direction, and detects an aggregate of the connected road surface grids RG as a traveling road surface. The traveling road surface information output unit 14 is implemented when the CPU loads a program stored in the ROM onto the RAM and executes the program loaded onto the RAM. As shown in FIG. 5B, when the road surface areas R1, R2, R3 of the parallax image G1 are projected onto the grid map G2, gaps appear in areas corresponding to the road surface areas R1, R2, R3 on the grid map G2. Gaps also appear in areas corresponding to the non-road surface areas on the grid map G2. In FIG. 5B, grids surrounded by thick-bordered boxes are gaps. Hereinafter, description will be made on the assumption that grids that do not correspond to pixels associated with road surface areas or non-road surface areas are gap grids. The gap grids appear because of the difference between the eye point of the parallax image G1 and the eye point of the grid map G2, the difference in size between each pixel that is the constituent unit of the parallax image G1 and each grid that is the constituent unit of the grid map G2, the fact that the capturing accuracy of the stereo camera 3 decreases as a capturing distance increases and an error of parallax information increases as a capturing distance increases, or the like. When a traveling road surface has been detected by using the grid map G2 that includes gap grids, there is a concern that the traveling road surface that is originally continuous is erroneously detected as divided traveling road surfaces.

Therefore, the traveling road surface detection apparatus 1 according to the present embodiment, for example, detects a traveling road surface on the assumption that an aggregate of road surface grids RG including gaps is an aggregate of road surface grids RG including no gaps. Specifically, the traveling road surface information output unit 14 detects not only road surface grids RG but also gap grids EG located between the road surface grids RG on the grid map G2 as a traveling road surface on the grid map G2. Each gap grid EG between the road surface grids RG on the grid map G2 means the gap grid EG sandwiched between the road surface grids RG in the scanning direction of the traveling road surface information output unit 14 on the grid map G2. For example, when the scanning direction (search direction) on the grid map G2 is the X direction (vehicle width direction, lateral direction), each gap grid EG located between the road surface grids RG on the grid map G2 is the gap grid EG sandwiched between a pair of the road surface grids RG in the X-axis direction on the grid map G2. For example, when the scanning direction (search direction) on the grid map G2 is the Y direction (depth direction, longitudinal direction), each gap grid EG located between the road surface grids RG on the grid map G2 is the gap grid EG sandwiched between a pair of the road surface grids RG in the Z-axis direction on the grid map G2.

The traveling road surface information output unit 14 is able to scan (search) and connect road surface grids not only in the lateral direction or the longitudinal direction but also in the oblique direction, and detect a traveling road surface. For example, the traveling road surface information output unit 14 may scan in the radially extending directions with respect to the position of the stereo camera 3 on the grid map G2. In this case, the gap grid EG sandwiched between the road surface grids RG means the gap grid EG sandwiched between a pair of the road surface grids RG arranged in one of the radially extending directions with reference to the position of the stereo camera 3.

The gap grid EG located between road surface grids RG on the grid map G2 may mean the gap grid EG only when the gap grid EG is sandwiched between a pair of adjacent road surface grids RG. As a specific example, only when a road surface grid RG, a gap grid EG and a road surface grid RG are arranged sequentially in the scanning direction, the gap grid EG is regarded as the gap grid EG located between the road surface grids RG on the grid map G2. By limiting the gap grid EG to the case where the gap grid EG is sandwiched between adjacent road surface grids RG, for example, even when a road surface grid RG has been erroneously detected at a distant location, it is possible to suppress detection of an area that should not be detected as a traveling road surface originally by using the erroneously detected road surface grid RG. On the contrary, the gap grid EG located between road surface grids RG on the grid map G2 is not limited to the gap grid EG only when the gap grid EG is sandwiched between a pair of adjacent road surface grids RG, but the gap grid EG located between road surface grids RG may mean a plurality of gap grids EG sandwiched between a pair of road surface grids RG. In this case, for example, even when a road surface grid RG, a gap grid EG1, a gap grid EG2 and a road surface grid RG are arranged sequentially in the scanning direction, the sandwiched two gap grids EG1, EG2 each are the gap grid EG located between road surface grids RG on the grid map G2. By not limiting the number of sandwiched gap grids EG, the opportunity to detect a gap grid EG as a traveling road surface increases, so it is possible to further improve a decrease in the accuracy of detecting a traveling road surface. Alternatively, the gap grid EG located between road surface grids RG on the grid map G2 may be limited to the case where the distance between a pair of road surface grids RG sandwiching the gap grid EG is larger than or equal to a predetermined value. In this case, for example, when there is a low-height obstacle, such as a curb, and a road surface area is recognized behind the obstacle in the parallax image G1, it is possible to suppress detection of an area that should not be detected as a traveling road surface originally. The traveling road surface information output unit 14 is able to limit the gap grid EG located between road surface grids RG on the grid map G2 to the above-described various meanings by setting the range of searching for one road surface grid RG to the next road surface grid RG to, for example, a predetermined value or smaller or a predetermined value or larger.

Figure 6A:
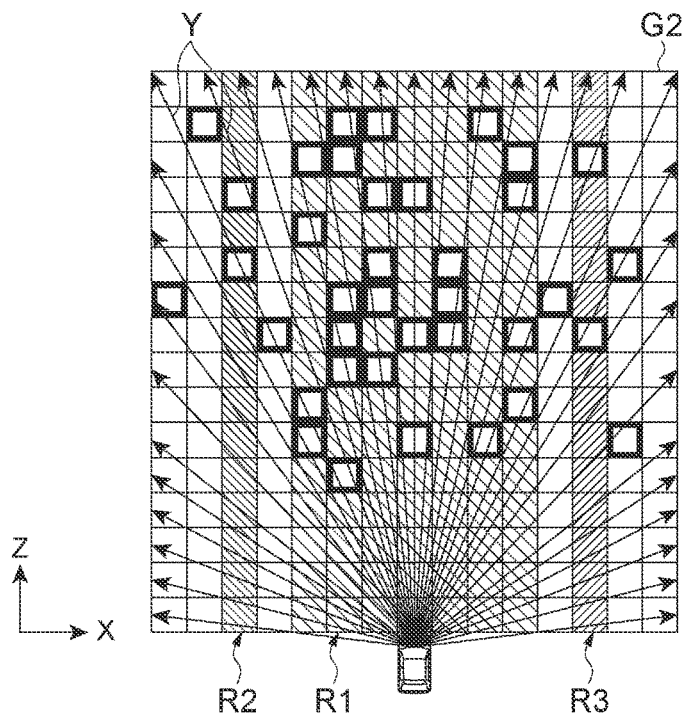
FIG. 6A is a view that illustrates an example in the case where the grid map is scanned in radially extending directions with reference to the position of the stereo camera as an example of a traveling road surface detection process on the grid map.
Figure 6B:
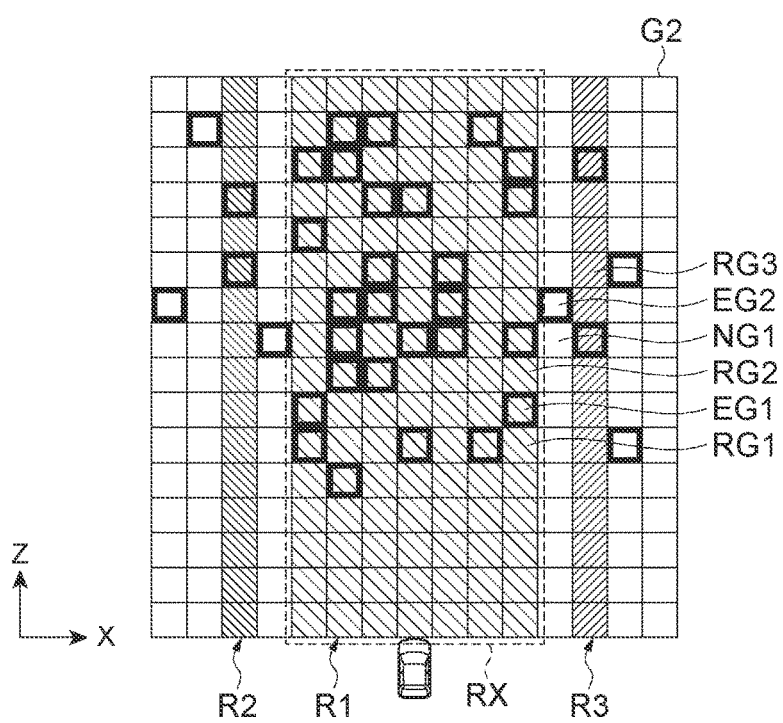
FIG. 6B is a view that illustrates the traveling road surface detection process on the grid map shown in FIG. 6A.

FIG. 6A and FIG. 6B are views that illustrate an example of a traveling road surface detection process on the grid map G2. FIG. 6A is an example of the case where the grid map G2 is scanned in the radially extending directions with reference to the position of the stereo camera 3, and each of the arrows Y indicates any one of the scanning directions. A search ID that uniquely identifies an arrow is assigned to each arrow. As shown in FIG. 3D, the traveling road surface information output unit 14 assigns a search ID regarding a corresponding one of the arrows Y to each of grid IDs of grids arranged along the corresponding one of the arrows Y shown in FIG. 6A. When the traveling road surface information output unit 14 searches in each arrow direction in the drawing on the grid map G2, the traveling road surface information output unit 14 extracts grid IDs with which the same search ID as the search ID regarding the corresponding arrow is associated. The traveling road surface information output unit 14 virtually one-dimensionally arranges the extracted grid IDs in order of distance from the vehicle by the use of the positional information of each grid ID of FIG. 3C, and scans the grids arranged one-dimensionally from the vehicle side toward the distant side, thus scanning in the oblique direction.

An example of the traveling road surface detection process on the grid map G2 will be described in detail by the use of the arrow Y shown in FIG. 6A and FIG. 6B. The search ID of the arrow Y is "1". The traveling road surface information output unit 14 extracts grid IDs "1", "3", . . . , "240" associated with the search ID "1" from the data table shown in FIG. 3D, and scans the grids of the extracted grid IDs in order of distance from the vehicle. FIG. 6B is a view that illustrates the traveling road surface detection process on the grid map G2 shown in FIG. 6A. As shown in FIG. 6B, a portion in which a road surface grid RG1, a gap grid EG1, a road surface grid RG2, a non-road surface grid NG1, a gap grid EG2, and a road surface grid RG3 are arranged in this order will be mainly described. The labels of the road surface grid RG1 and road surface grid RG2 are "1", and the label of the road surface grid RG3 is "3".

The traveling road surface information output unit 14 scans along the arrow Y, and determines that road surface grids are continuous from the vehicle to the road surface grid RG1. When the traveling road surface information output unit 14 has detected the gap grid EG1, the traveling road surface information output unit 14 determines whether there is a road surface grid RG on a further distant side. There is the road surface grid RG2 on the distant side of the gap grid EG1. The traveling road surface information output unit 14 determines whether the label of the road surface grid RG1 and the label of the road surface grid RG2 are the same. Because the labels of the road surface grid RG1 and road surface grid RG2 are "1", the traveling road surface information output unit 14 determines that the road surface grid RG1 and the road surface grid RG2 are the pair of road surface grids RG arranged in one of the radially extending directions, and determines that the gap grid EG1 is a gap grid EG sandwiched between the pair of road surface grids RG. The traveling road surface information output unit 14 converts the gap grid EG1 to a road surface grid RG. Specifically, the traveling road surface information output unit 14 changes the road surface flag of the gap grid EG1 from "−" to "1" in the data tables shown in FIG. 3A to FIG. 3D. The traveling road surface information output unit 14 may assign the same label as the labels of the pair of road surface grids RG as the label of the gap grid EG1. Thus, an aggregate of the road surface grids RG with a gap is interpolated.

On the other hand, after the traveling road surface information output unit 14 determines that the road surface grids RG are continuous from the vehicle to the road surface grid RG2, the traveling road surface information output unit 14 further scans along the arrow Y. When the traveling road surface information output unit 14 has detected the non-road surface grid NG1, the traveling road surface information output unit 14 determines whether there is a road surface grid RG on the further distant side. There are the gap grid EG2 and the road surface grid RG3 on the far side of the non-road surface grid NG1. The traveling road surface information output unit 14 determines whether the label of the road surface grid RG2 is the same as the label of the road surface grid RG3. The label of the road surface grid RG2 is "1", and the label of the road surface grid RG3 is "3". In this way, when the labels respectively associated with pixels corresponding to a pair of road surface grids RG that sandwich a gap grid EG are different from each other, the traveling road surface information output unit 14 does not detect the gap grid EG sandwiched between the pair of road surface grids RG as a traveling road surface. That is, the traveling road surface information output unit 14 does not convert the gap grid EG2 to a road surface grid RG. More specifically, the traveling road surface information output unit 14 keeps the road surface flag of the gap grid EG at "−" in the data tables shown in FIG. 3A to FIG. 3D. In this way, the traveling road surface detection apparatus 1 is able to avoid erroneous detection of a gap grid EG, corresponding to a pixel between the road surface areas R1, R3, as a traveling road surface when the plurality of road surface areas R1, R2, R3 are included in the parallax image.

The traveling road surface information output unit 14 executes the above-described process on all the search IDs. As shown in FIG. 6B, an aggregate of road surface grids RG is interpolated. The traveling road surface information output unit 14 selects an aggregate closest to the vehicle from among a plurality of aggregates of road surface grids RG. For example, in the situation shown in FIG. 6B, the traveling road surface information output unit 14 selects an aggregate RX of road surface grids RG. The traveling road surface information output unit 14 detects the area of the aggregate RX of road surface grids RG as a traveling road surface on the grid map G2. In this way, when an aggregate of road surface grids RG includes a gap, the traveling road surface detection apparatus 1 detects a traveling road surface on the assumption that the aggregate of road surface grids RG includes no gap.

Figure 7:
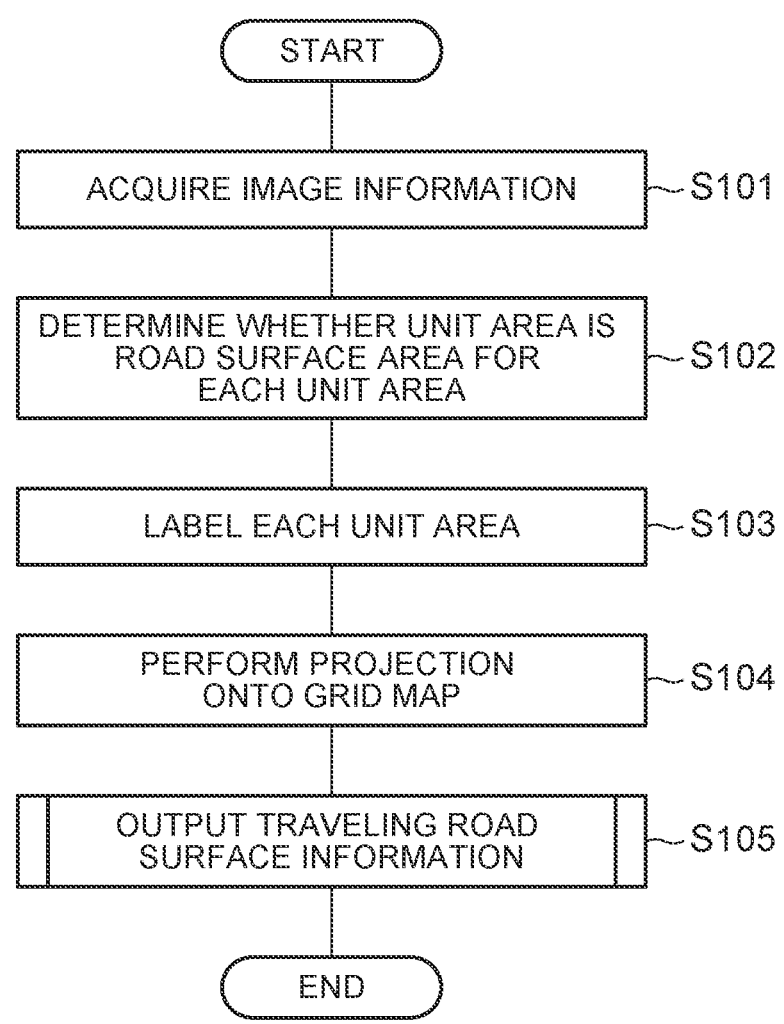
FIG. 7 is a flowchart that shows an example of a traveling road surface detection method that is used by the traveling road surface detection apparatus according to the embodiment.

Traveling Road Surface Detection Method for Traveling Road Surface Detection Apparatus Next, a traveling road surface detection method for the traveling road surface detection apparatus 1 will be described with reference to the accompanying drawings. FIG. 7 is a flowchart that shows an example of the traveling road surface detection method that is used by the traveling road surface detection apparatus 1. The flowchart shown in FIG. 7 is, for example, executed at preset time intervals while the vehicle is driven by an engine.

As shown in FIG. 7, the ECU 2 acquires an image with the use of the image acquisition unit 10 in step S101. The image acquisition unit 10 acquires a parallax image around the vehicle from the stereo camera 3.

Subsequently, in step S102, the ECU 2 executes the process of determining whether a pixel is a road surface area (area determination step) for each pixel (each unit area) by the area determination unit 11. The area determination unit 11 estimates a road surface gradient for each pixel by utilizing statistical data acquired in advance and indicating the relationship between depth information and a road surface gradient. Subsequently, the area determination unit 11 acquires the height information Hy (corresponding to y coordinate in the parallax image) of each estimated road surface gradient by using the depth information of the corresponding pixel (x coordinate, y coordinate) and the estimated road surface gradient. The area determination unit 11 compares the y coordinate with the height information Hy. When the difference is smaller than a predetermined value, the area determination unit 11 determines that the intended pixel is a road surface area; whereas, when the difference is larger than or equal to the predetermined value, the area determination unit 11 determines that the intended pixel is a non-road surface area.

Subsequently, in step S103, the ECU 2 executes the process of labeling each pixel (each unit area) with the use of the area identification unit 12. The area identification unit 12 associates a label that identifies the corresponding road surface area with each pixel determined as the road surface area by the area determination unit 11 on the basis of the coordinate position of the pixel determined as the road surface area by the area determination unit 11.

Subsequently, in step S104, the ECU 2 executes projection process (coordinate transformation process) onto the grid map with the use of the coordinate transformation unit 13. The coordinate transformation unit 13 associates each pixel with a grid in the grid map (an example of a map) on the basis of the parallax information and coordinate position of the pixel (unit area). The eye point of the grid map is set so as to be higher than the eye point of the parallax image G1. The grid map is obtained by partitioning an area spreading ahead of the vehicle (an example of an area around the vehicle) in a grid.

Subsequently, in step S105, the ECU 2 executes the process of outputting traveling road surface information (detection step) with the use of the traveling road surface information output unit 14. The traveling road surface information output unit 14, for example, outputs the traveling road surface information that an aggregate of road surface grids RG closest to the vehicle is a traveling road surface. The traveling road surface information output unit 14, for example, outputs the traveling road surface information to an ECU that automatically drives the vehicle or an ECU that supports driving of the vehicle. When step S105 ends, the ECU 2 ends the flowchart shown in FIG. 7.

Figure 8:
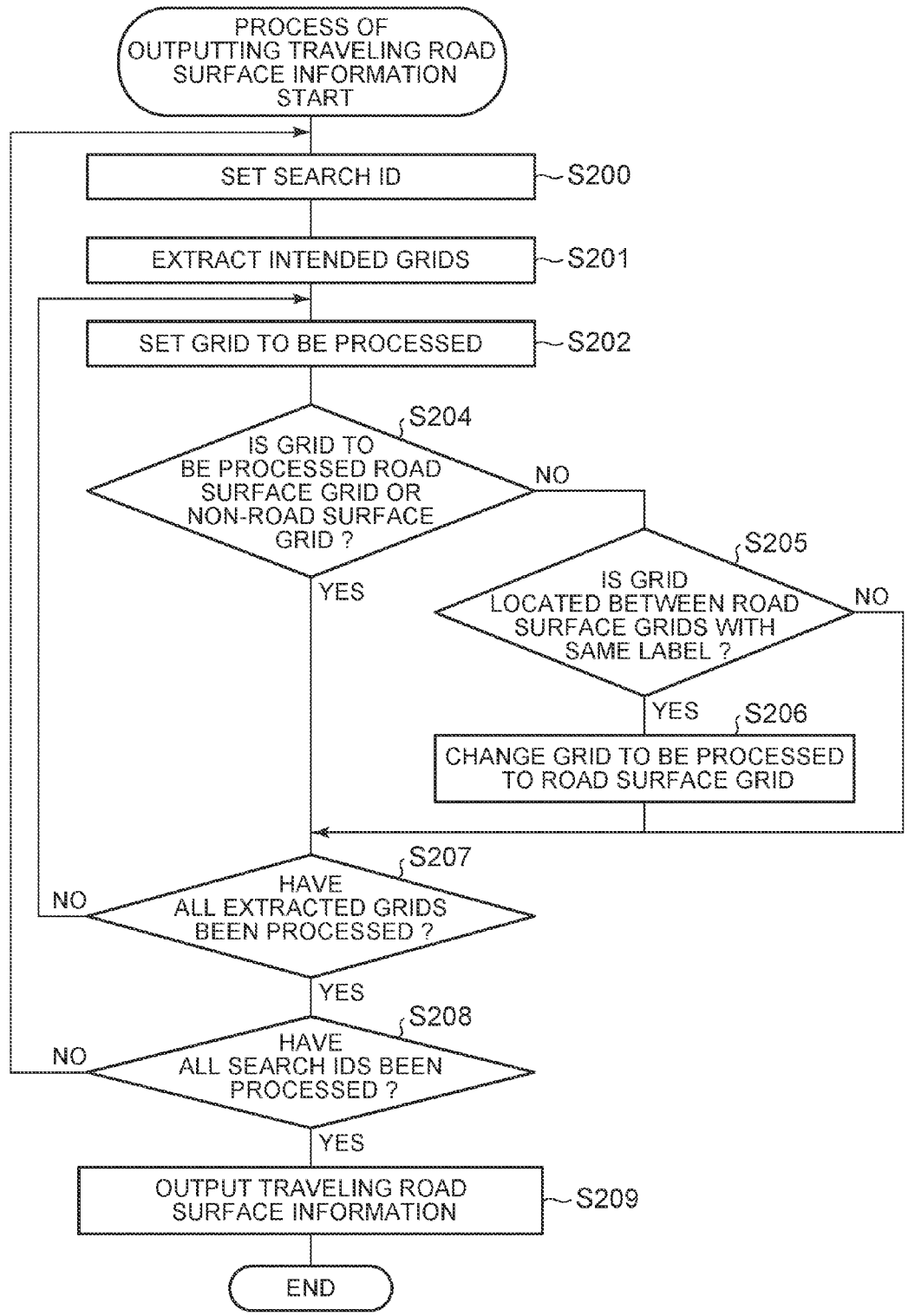
FIG. 8 is a flowchart that shows an example of the process of outputting traveling road surface information by the traveling road surface detection apparatus according to the embodiment.

The details of the process of step S105 shown in FIG. 7 are shown in FIG. 8. FIG. 8 is a flowchart that shows an example of the process of outputting traveling road surface information by the traveling road surface detection apparatus 1.

As shown in FIG. 8, the ECU 2 executes the process of setting a search ID to be processed with the use of the traveling road surface information output unit 14 in step S200. The traveling road surface information output unit 14 selects and sets one search ID to be processed from among a plurality of search IDs.

Subsequently, in step S201, the ECU 2 executes the process of extracting grids with the use of the traveling road surface information output unit 14. The traveling road surface information output unit 14 extracts all the intended grids on the grid map G2 on the basis of the search ID set in step S200.

Subsequently, in step S202, the ECU 2 executes the process of setting grids to be processed with the use of the traveling road surface information output unit 14. The traveling road surface information output unit 14 sets grids to be processed on the basis of the search ID set in step S200. For example, the traveling road surface information output unit 14 arranges all the intended grids on the grid map G2 in order of distance to the vehicle, and selects one grid to be processed. The traveling road surface information output unit 14 selects one grid such that a grid is preferentially processed as the distance to the grid reduces.

Subsequently, in step S204, the ECU 2 executes road surface grid determination process with the use of the traveling road surface information output unit 14. The traveling road surface information output unit 14 determines whether the grid set in step S202 is a road surface grid RG or a non-road surface grid NG. That is, the traveling road surface information output unit 14 determines whether the grid set in step S202 is a gap grid EG. When the traveling road surface information output unit 14 determines that the grid set in step S202 is a road surface grid RG or a non-road surface grid NG (YES in S204), the ECU 2 advances the process to step S207. That is, when the grid set in step S202 is not a gap grid, the ECU 2 advances the process to step S207. On the other hand, when the traveling road surface information output unit 14 determines that the grid set in step S202 is neither a road surface grid RG nor a non-road surface grid NG (NO in S204), the ECU 2 advances the process to step S205. That is, when the grid set in step S202 is a gap grid, the ECU 2 advances the process to step S205.

The ECU 2 executes same label determination process with the use of the traveling road surface information output unit 14 in step S205. The traveling road surface information output unit 14 determines whether the gap grid EG that is the grid set in step S202 is located between road surface grids RG with the same label. When the traveling road surface information output unit 14 determines that the gap grid EG is located between road surface grids RG with the same label (YES in S205), the ECU 2 advances the process to step S206. On the other hand, when the traveling road surface information output unit 14 determines that the gap grid EG is not located between road surface grids RG with the same label (NO in S205), the ECU 2 advances the process to step S207.

The ECU 2 executes interpolation process with the use of the traveling road surface information output unit 14 in step S206. The traveling road surface information output unit 14 changes the gap grid EG that is the grid set in step S202 to a road surface grid RG. After that, the ECU 2 advances the process to step S207.

The ECU 2 executes the process of determining whether the process has completed on all the grids extracted in step S201 with the use of the traveling road surface information output unit 14 in step S207. When the traveling road surface information output unit 14 determines that the process has not completed on all the grids (NO in S207), the ECU 2 returns to step S202, and executes the process of setting the next grid to be processed. That is, until the traveling road surface information output unit 14 determines that the process has completed on all the grids extracted in step S201 (YES in S207), the ECU 2 repeatedly executes step S202 to step S207. Thus, searching regarding one of the arrows shown in FIG. 6A completes, and the gap grid EG that satisfies a condition is changed to a road surface grid RG.

When the traveling road surface information output unit 14 determines that the process has completed on all the grids (YES in S207), the ECU 2 executes the process of determining whether the process has completed on all the search IDs with the use of the traveling road surface information output unit 14. When the traveling road surface information output unit 14 determines that the process has not completed on all the search IDs (NO in S208), the ECU 2 returns to step S200, and executes the process of determining the next search ID to be processed. That is, until the traveling road surface information output unit 14 determines that the process has completed on all the search IDs (YES in S208), the ECU 2 repeatedly executes step S200 to step S208. Thus, searching regarding all the arrows shown in FIG. 6A completes.

Subsequently, in step S209, the ECU 2 executes the process of outputting traveling road surface information with the use of the traveling road surface information output unit 14. The traveling road surface information output unit 14 detects an aggregate obtained by connecting continuous road surface grids RG determined in each searching direction as a traveling road surface on the grid map G2. The traveling road surface information output unit 14 outputs information about the detected traveling road surface (traveling road surface information) to, for example, another ECU, or the like. When the process of step S209 ends, the flowchart shown in FIG. 8 ends.

Operation and Advantageous Effects of Traveling Road Surface Detection Apparatus and Traveling Road Surface Detection Method With the above-described traveling road surface detection apparatus (traveling road surface detection method) 1, after the coordinate transformation unit 13 performs coordinate transformation from the parallax image G1 to the grid map G2, each gap grid EG located between road surface grids RG on the grid map G2 is detected as a traveling road surface on the grid map G2 by the traveling road surface information output unit 14. Therefore, with the traveling road surface detection apparatus 1, for example, even when areas on the grid map G2, corresponding to the road surface areas R1, R2, R3, are discontinuous at the time when the parallax image G1 including the road surface areas R1, R2, R3 are subjected to coordinate transformation and projected onto the grid map G2, it is possible to detect a traveling road surface by interpolating discontinuous areas. Therefore, this apparatus is able to improve a decrease in the accuracy of detecting a traveling road surface.

With the traveling road surface detection apparatus (traveling road surface detection method) 1, the traveling road surface information output unit 14 is able to set each gap grid EG sandwiched between road surface grids RG arranged in one of radially extending directions with reference to the position of the stereo camera 3 on the grid map G2 for the gap grid EG located between road surface grids RG on the grid map G2. For example, if the apparatus is configured to detect each gap grid EG sandwiched between road surface grids RG arranged in the lateral direction (vehicle width direction) with reference to the position of the stereo camera 3 on the grid map G2 as a traveling road surface, there is a concern that a gap grid EG behind an obstacle, which cannot be recognized from the stereo camera 3 that is an observation point, is detected as a traveling road surface. In contrast, the traveling road surface detection apparatus 1 scans in the radially extending directions with reference to the position of the stereo camera 3 on the grid map G2. Thus, the traveling road surface detection apparatus 1 sets each gap grid EG sandwiched between road surface grids RG arranged in one of the radially extending directions with reference to the position of the stereo camera 3 for the gap grid EG located between road surface grids RG on the grid map G2. Therefore, for example, the traveling road surface detection apparatus 1 is able to avoid erroneous detection of a gap grid EG behind an obstacle as a traveling road surface.

With the traveling road surface detection apparatus (traveling road surface detection method) 1, the traveling road surface information output unit 14 may be configured to, when labels respectively associated with pixels corresponding to a pair of the road surface grids RG that sandwich the gap grid EG are different from each other, not detect the gap grid EG sandwiched between the pair of the road surface grids RG as a traveling road surface. In this case, for example, when the plurality of road surface areas R1, R2, R3 are included in the parallax image G1, the traveling road surface detection apparatus 1 is able to avoid erroneous detection of a gap grid EG corresponding to a pixel between road surface areas as a traveling road surface.

The embodiment of the invention is described above; however, the invention is not limited to the above-described embodiment. For example, in the above-described embodiment, the example in which the ECU 2 includes the image acquisition unit 10, the area determination unit 11, the area identification unit 12, the coordinate transformation unit 13 and the traveling road surface information output unit (detection unit) 14 is described. Instead, the ECU 2 does not necessarily include the area identification unit 12.

In the above-described embodiment, the traveling road surface detection apparatus 1 is described as an apparatus mounted on the vehicle; however, the traveling road surface detection apparatus 1 is not limited to an in-vehicle apparatus. For example, the traveling road surface detection apparatus 1 may be a server, or the like, that is installed outside the vehicle and that is able to acquire a parallax image through communication.

In the above-described embodiment, the example in which the first camera 4 and the second camera 5 are provided on the back side of the windshield of the vehicle and capture images ahead of the vehicle; however, the installation position of the first camera 4 and second camera 5 is not limited to this position. For example, the first camera 4 and the second camera 5 may be provided at the side of the vehicle or the rear (for example, the back side of a rear window) of the vehicle, and may capture images to the side or rear of the vehicle. In this case, the coordinate transformation unit 13 just needs to prepare a grid map such that the eye point of the grid map is set so as to be higher than the eye point of a parallax image and an area to the side or rear of the vehicle is partitioned in a grid, and then execute coordinate transformation process. That is, the coordinate transformation unit 13 just needs to prepare a grid map in which an area around the vehicle is partitioned in a grid commensurately with a direction in which a parallax image is captured. With this configuration, for example, even when the vehicle reverses, the traveling road surface detection apparatus 1 is able to improve a decrease in the accuracy of detecting a traveling road surface.

In the above-described embodiment, the grid map G2 in plan view is described; however, the grid map is not limited to a map in plan view. The grid map may be a bird's-eye view of which the eye point is set so as to be higher than the eye point of the parallax image G1. FIG. 5B shows an example of the grid map G2 corresponding to the predetermined area A1 in the parallax image G1. The size of the predetermined area A1 may be set as needed. For example, the overall parallax image G1 may be set for the predetermined area A1.

In the above-described embodiment, the example in which the traveling road surface detection apparatus 1 is connected to the stereo camera 3 is described.

Instead of the stereo camera 3, a monocular camera may be provided. With a monocular camera, it is possible to obtain a parallax image by using a known technique (for example, a technique using a time difference in capturing an image in the vehicle that is traveling).

In the above-described embodiment, the example in which the traveling road surface information output unit 14 converts each gap grid EG located between road surface grids RG to a road surface grid RG is described. However, it is not always necessary to execute the process of converting the gap grid EG to a road surface grid RG. A traveling road surface may be detected on the assumption that each gap grid EG is a road surface grid RG at the time when connectivity of the road surface grids RG is finally determined. Such a process may be, for example, implemented by using a road surface grid assumption flag, or the like.

What is claimed is:

1. A traveling road surface detection apparatus that detects a traveling road surface on the basis of a parallax image around a vehicle, the parallax image being acquired by an in-vehicle camera, the traveling road surface detection apparatus comprising:
    an electronic control unit configured to i) determine using parallax information of the parallax image whether a unit area is a road surface area or a non-road surface area for each unit area of the parallax image, each unit area including one or multiple pixels, ii) associate each unit area with a grid in a map on the basis of parallax information, and coordinate position of the unit area, an eye point of the map being set so as to be higher than an eye point of the parallax image, the map being obtained by partitioning an area around the vehicle in a grid, and iii) detect road surface grids and each grid located between the road surface grids on the map as the traveling road surface on the map, the road surface grids being the grids corresponding to the unit areas determined as the road surface areas.

2. The traveling road surface detection apparatus according to claim 1, wherein
    the electronic control unit detects the traveling road surface on the map by setting each grid sandwiched between the road surface grids arranged in one of radially extending directions with reference to a position of the in-vehicle camera on the map for a grid located between the road surface grids on the map.

3. The traveling road surface detection apparatus according to claim 1, wherein:
the electronic control unit configured to associate identification information that identifies the corresponding road surface area with each unit area determined as the road surface area, on the basis of a coordinate position or pixel information of each unit area determined as the road surface area wherein
when the identification information respectively associated with the unit areas corresponding to a pair of the road surface grids that sandwich the grid are different from each other, the electronic control unit does not detect the grid sandwiched between the pair of the road surface grids as the traveling road surface.

4. A traveling road surface detection method that detects a traveling road surface on the basis of a parallax image around a vehicle including an electronic control unit, the parallax image being acquired by an in-vehicle camera, the traveling road surface detection method comprising:

determining, by the electronic control unit, using parallax information of the parallax image whether a unit area is a road surface area or a non-road surface area for each unit area of the parallax image, each unit area including one or multiple pixels;

associating, by the electronic control unit, each unit area with a grid in a map on the basis of parallax information and coordinate position of the unit area, an eye point of the map being set so as to be higher than an eye point of the parallax image, the map being obtained by partitioning an area around the vehicle in a grid; and detecting, by the electronic control unit, road surface grids and each grid located between the road surface grids on the map as the traveling road surface on the map, the road surface grids being the grids corresponding to the unit areas determined as the road surface areas.

* * * * *